United States Patent [19]

Camp et al.

[11] 4,068,412
[45] Jan. 17, 1978

[54] GRINDING MACHINE

[75] Inventors: Edward C. Camp, Princeton; Ellsworth C. Enos, Holden; Dennis Michael Bombara, Douglas, all of Mass.

[73] Assignee: Cincinnati Milacron-Heald Corporation, Worcester, Mass.

[21] Appl. No.: 742,411

[22] Filed: Nov. 12, 1976

[51] Int. Cl.² .......................... B24B 5/04; B24B 41/06
[52] U.S. Cl. ..................................... 51/5 D; 51/105 R; 51/277
[58] Field of Search .................... 51/5 R, 5 D, 105 R, 51/105 SP, 73 R, 277; 125/11 CD; 269/7

[56] References Cited

U.S. PATENT DOCUMENTS

| 3,089,296 | 5/1963 | Brady | 51/277 X |
| 3,200,540 | 8/1965 | Lavallee | 51/73 R |
| 3,468,366 | 9/1969 | Suddarth | 51/277 X |
| 3,526,058 | 9/1970 | Price | 51/105 SP X |
| 3,977,126 | 8/1976 | Hohler | 51/5 D |
| 4,001,975 | 1/1977 | Bernard | 51/5 R |

FOREIGN PATENT DOCUMENTS 315,571 11/1971 U.S.S.R. .............................. 51/5 D

Primary Examiner—Harold D. Whitehead
Assistant Examiner—Nicholas P. Godici
Attorney, Agent, or Firm—Norman S. Blodgett; Gerry A. Blodgett

[57] ABSTRACT

Grinding machine for a workpiece having a reference surface that cannot be used for mounting the workpiece for grinding and, yet, must be located near the abrasive wheel to permit accurate grinding of surfaces relative to the reference surface; the machine includes a chuck adapted to mate with a locating surface in a workhead and to mate with a similar locating surface in a mounting means, the mounting means including a clamp for engaging the reference surface on the workpiece and holding it in a fixed predetermined relationship to the locating surface on the chuck.

3 Claims, 12 Drawing Figures

GRINDING MACHINE

BACKGROUND OF THE INVENTION

In the grinding of surfaces of revolution on workpieces, there is usually a reference surface of revolution to which the surface to be ground is to be accurately geometrically related. Usually, it is possible to use the reference surface to mount the workpiece on the workhead, so that the wheelhead will lie at a known predetermined relationship to it. In such a situation it is relatively easy to relate the finished surface to the reference surface. For instance, in the case of grinding an internal bore on the outer race of a roller bearing, the outer surface of the race can either be clamped or it can rest on fixed shoes while the spindle of the workhead rotates it. Some workpiece configurations prohibit this type of treatment, however. This is true, for instance, if the reference surface is not available for support of the workpiece, as is the case where a finger or flange extends axially around the surface. It is also true in the situation in which the reference surface itself is to be ground at the same time as other surfaces of revolution that are related to it. Attempts to handle such awkward workpieces in the past have involved mounting the workpiece on the workhead spindle by use of various chucking, jig, and trial-and-error methods, but none of these lend themselves to any kind of production manufacture. For one thing, they all would involve a very long setup time, during which time the machine is non-productive; in the case of a very expensive grinding machine this means that the operation on the workpiece is a very expensive one. These and other difficulties experienced with the prior art devices have been obviated in a novel manner by the present invention.

It is, therefore, an outstanding object of the invention to provide a grinding machine for finishing workpieces on a production basis.

Another object of this invention is the provision of a grinding machine for generating surfaces of revolution on a workpiece in precise geometric relationship to a reference surface of revolution in the case where the reference surface of revolution cannot be used for supporting the workpiece.

A further object of the present invention is the provision of a grinding machine for finishing a surface of revolution on one end of an elongated workpiece where the axis of the surface of revolution is at a substantial angle to most of the length of the workpiece.

It is another object of the instant invention to provide a grinding method for finishing a surface of revolution where the surface is at least partly enveloped in a skirt or the like, so that radial access to the surface is not available.

A still further object of the invention is the provision of a grinding machine having a chuck for holding odd-shaped workpieces during the grinding of surfaces of revolution.

With these and other objects in view, as will be apparent to those skilled in the art, the invention resides in the combination of parts set forth in the specification and covered by the claims appended hereto.

SUMMARY OF THE INVENTION

In general, the invention consists of a grinding machine having a workpiece-holding chuck, having a locating surface, and having an open-ended container normally holding a low-temperature melting alloy in which a first portion of the workpiece is embedded. A second portion of the workpiece is exposed with a reference surface on which the grinding operation is to be performed. A workhead and a wheelhead are mounted for relative controlled movement to perform the grinding operation. The workhead has a locating surface for engagement by the locating surface on the chuck. A setup head (remote from the workhead) has a locating surface exactly similar to the locating surface on the workhead and has a clamping means for engaging the said reference surface to hold the workpiece in the container in such a way that the locating surface of the chuck and the reference surface of the workpiece lie in a predetermined geometric relationship.

More specifically, means is provided in connection with the setup head to heat the alloy quickly above its melting point for the removal of a finished workpiece and the introduction of an unfinished piece and also to cool the alloy quickly to lock the unfinished workpiece in place in the container. The wheelhead is provided with a rotatable cantilevered spindle on which is mounted a cup-shaped abrasive wheel whose interior is formed with a surface of revolution which is to be reproduced on the workpiece. A diamond dressing wheel is provided having a similar surface of revolution which is cantilever-supported and is rotated by a motor for plunge dressing of the surface of revolution on the interior of the abrasive wheel.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
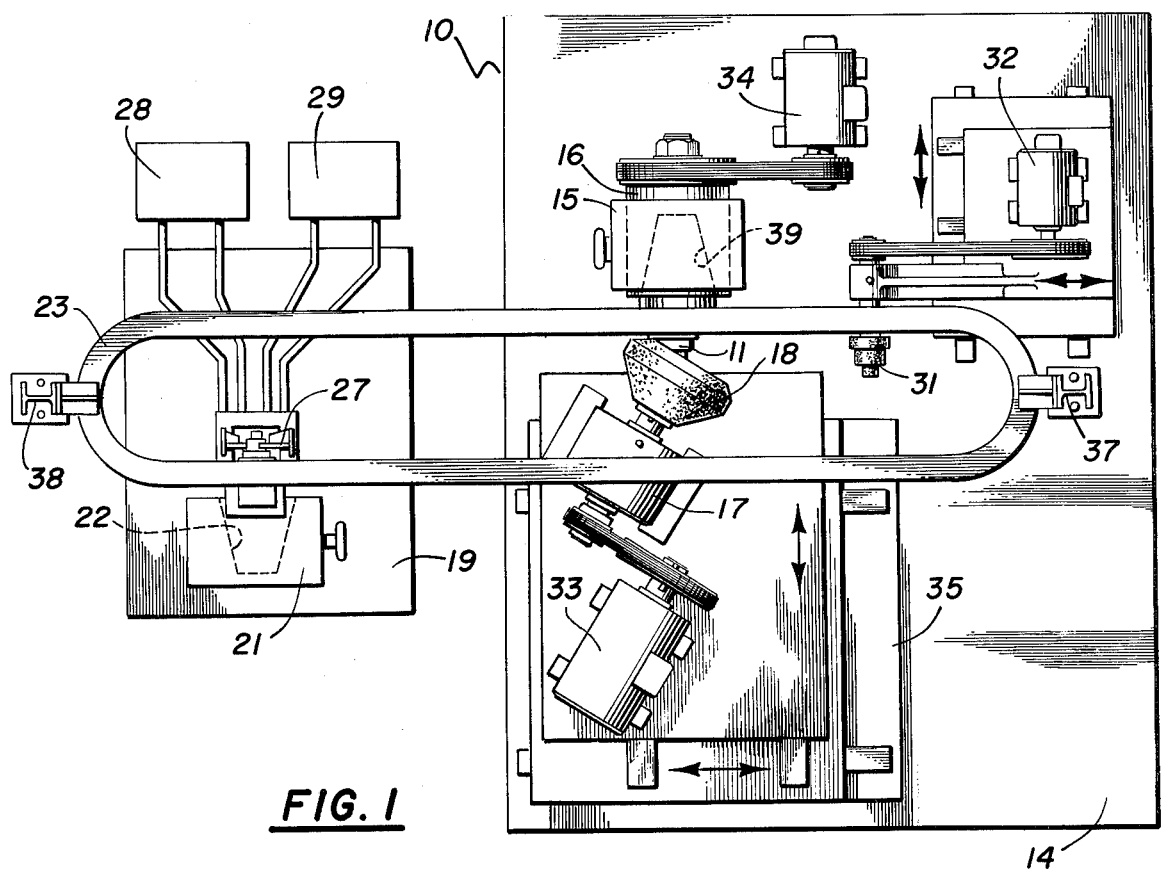
FIG. 1 is a plan view of a grinding machine incorporating the principles of the present invention.
Figure 2:
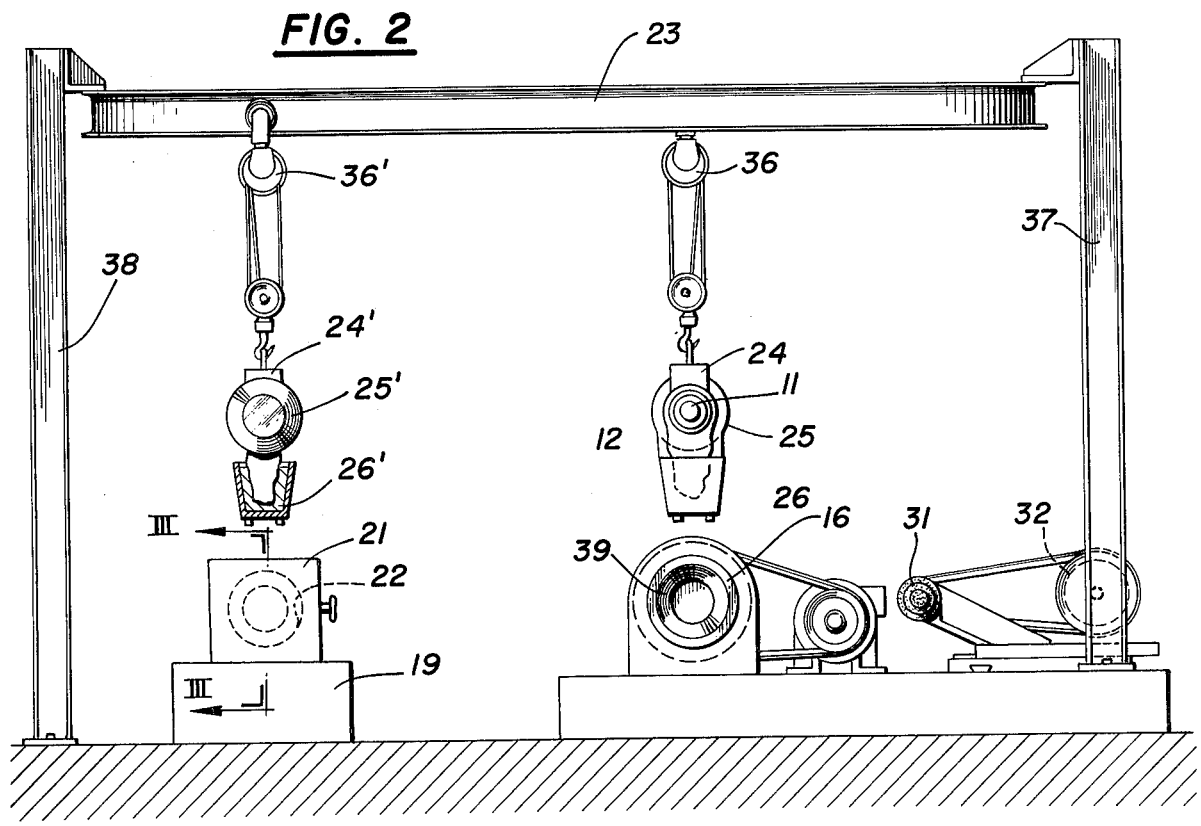
FIG. 2 is an end elevational view of the grinding machine.

Referring first to FIGS. 1 and 2, wherein are best shown the general features of the invention, the grinding machine, indicated generally by the reference numeral 10, is shown as used to generate a group of surfaces of revolution on a workpiece 11, which surfaces are accurately geometrically related to a reference surface 13 of revolution. As shown, the workpiece has an irregular elongated portion 12 at one end and has the said reference surface 13 and the surfaces to be generated located at the other end.

A first base 14 has mounted on it a workhead 15 having a rotatable spindle 16 having a locating surface 39 in the form of an internal frustrum of a cone with a camlock locking means. Also mounted on the base is a wheelhead 17 carrying a cup-shaped abrasive wheel 18.

Mounted on a second base 19 is a holder 21 which has a locating surface 22 which is exactly like the surface 39 in the workhead spindle and is also provided with a camlock locking means.

A conveyor 23 overlies the bases 14 and 19 and consists of an I-beam formed into an elongated loop held on supports 37 and 38. The conveyor is used to move workpieces from one base to the other.

A chucking means 24 is shown as suspended from the conveyor and provided with a locating surface 25 having a frusto-conical shape that fits snugly into either the locating surface 22 of the holder or the locating surface 30 in the workhead 15 and can be locked in place.

Figure 3:
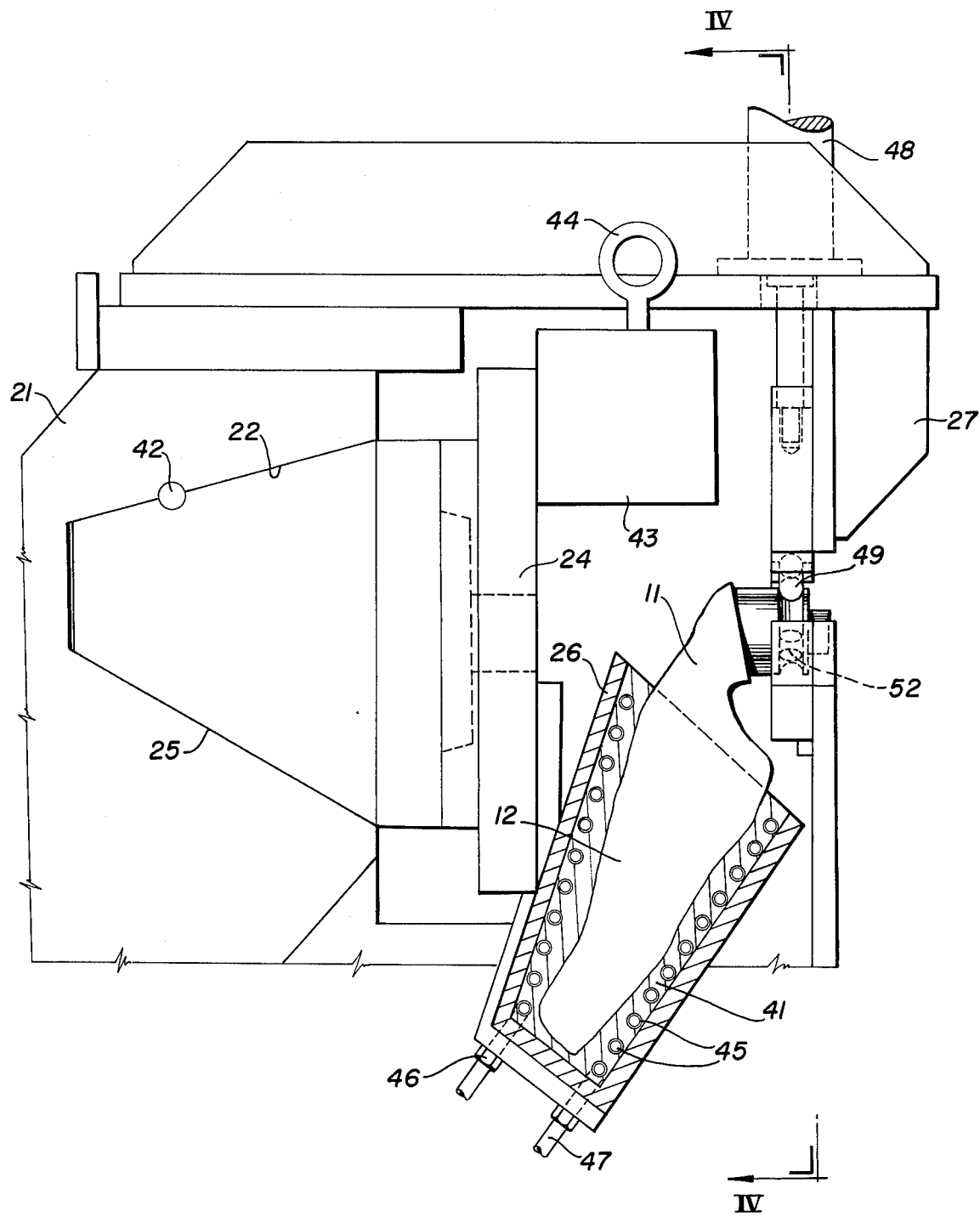
FIG. 3 is a vertical sectional view of a portion of the machine as viewed on the line III—III of FIG. 1.
Figure 4:
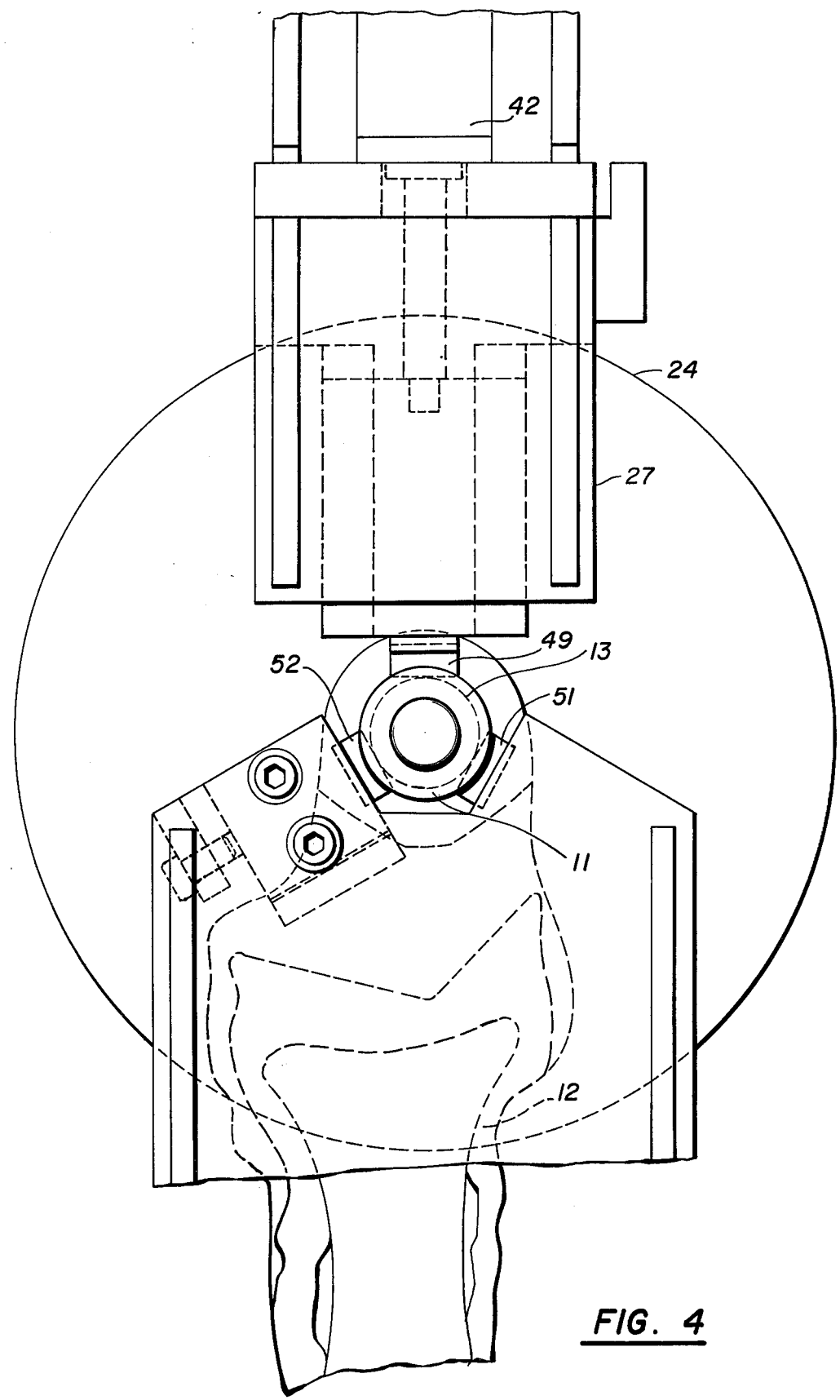
FIG. 4 is an end elevational view of the machine taken on the line IV—IV of FIG. 3.

Referring to FIGS. 3 and 4, it can be seen that the chucking means 24 is provided with an open-ended container 26, containing a body 41 of a low--temperature-melting alloy. The first portion 12 of the workpiece 11 is embedded in this body and the other end of the workpiece, carrying the reference surface 13, as well as the portion on which various surfaces of revolution are to be ground, is exposed. The workhead 15 and the wheelhead 17 are mounted in the conventional way to perform the grinding operation. This includes the provision of a wheelhead table 35 (see FIG. 1) on which the wheelhead and its drive motor 33 are mounted. The movements of the table 35 provide the relative movement between the abrasive wheel 18 on the one hand and the workpiece 11 in the workhead 15 and the dressing wheel 31 with its drive motor 32 on the other hand.

In FIG. 3 it can be seen that the holder 21 is provided with a clamping means 27 having a pneumatic cylinder 48 which presses a pressure bar 49 against the reference surface 13, which in the illustration is shown having an annular shape in the manner of a ball track of a ball bearing. The reference surface is also pressed aginst two fixed pressure bars 51 and 52. The chucking means also carries a weight 43 to counterbalance the off-center weight of the workpiece 11, the container 26, and the body 41 of alloy. A supporting ring 44 extends upwardly from the weight 43 and the camlock 42 is shown in position to lock the surfaces 22 and 25 together. Extending around the inside of the container is a coil 45 for carrying either cooling or heating liquid; from the bottom of the container protrude connections 46 and 47 by which this coil can be connected to sources of suitable fluid.

Figure 5:
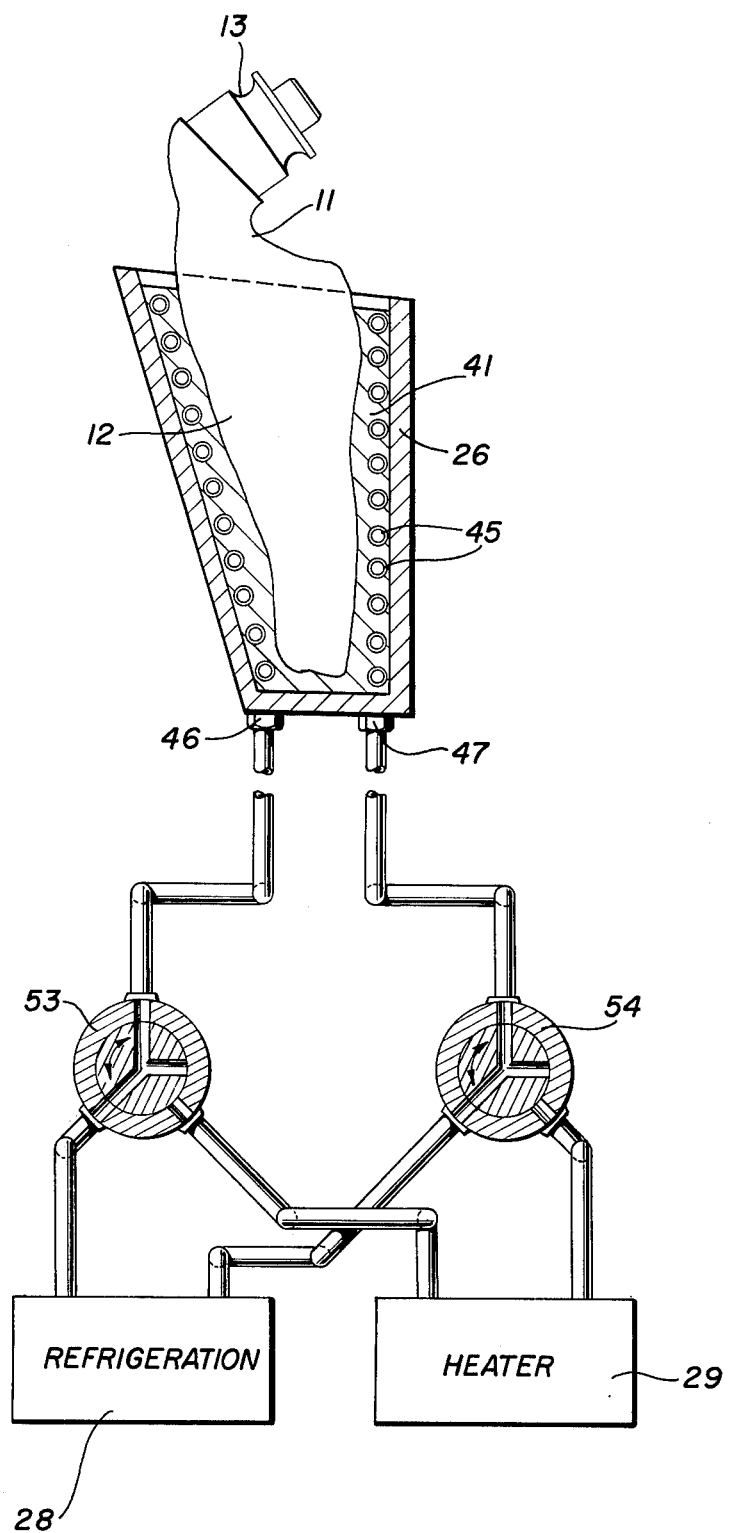
FIG. 5 is a schematic view of a portion of the machine showing attachments to heating and cooling equipment.

In FIG. 5 it can be seen that the connections 46 and 47 on the container 26 are connected through valves 53 and 54 which are joined by suitable conduits to a refrigeration apparatus 28 and a heater apparatus 29. By this means and the setting of the valves 53 and 54, cool liquid or heated liquid can be passed through the coil 45 to either heat or cool the body 41 of alloy.

Figure 6:
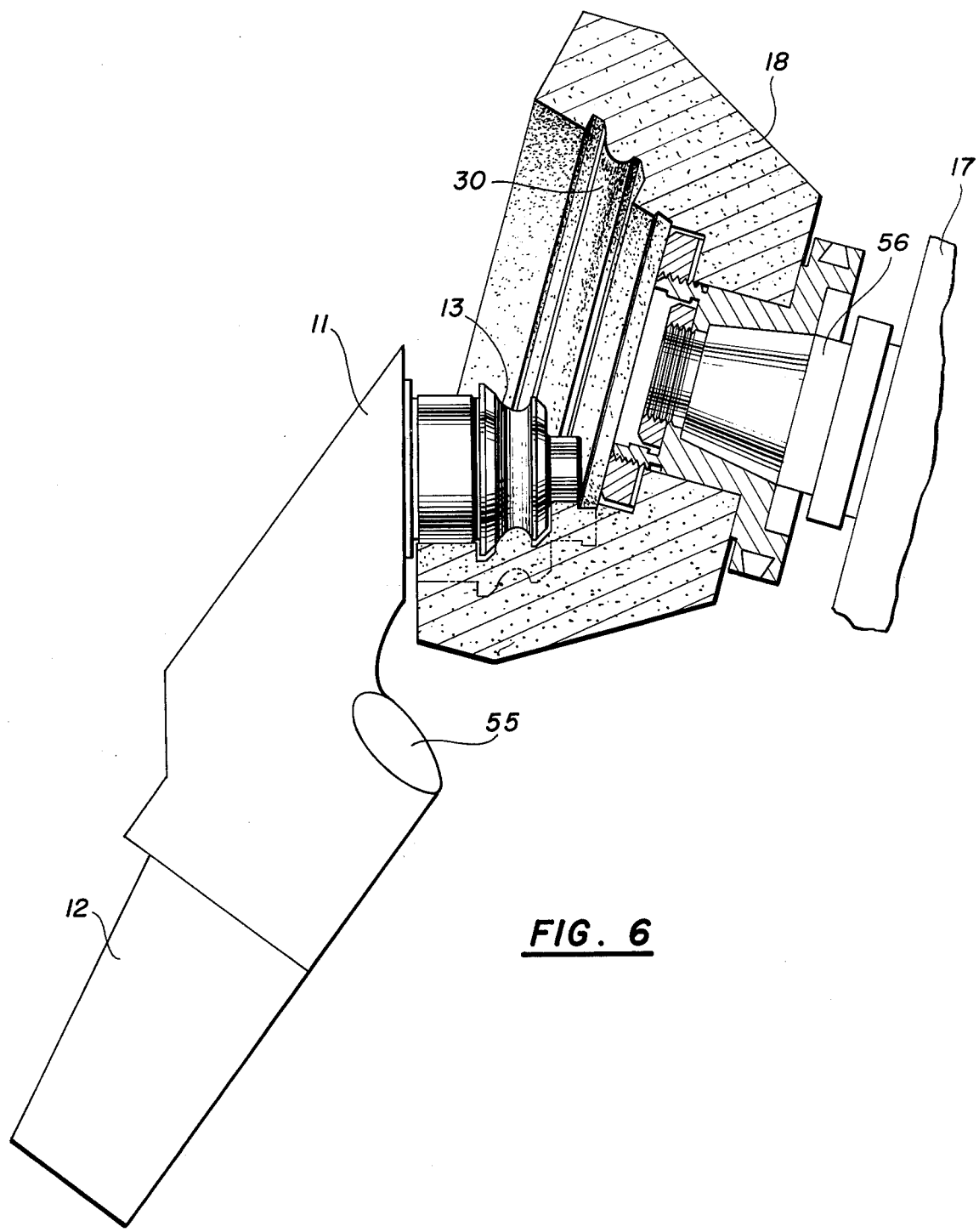
FIG. 6 is an enlarged somewhat-schematic view of the workpiece and abrasive wheel used in the machine.

As is clear in FIG. 6, the workpiece 11 has the elongated portion 12 extending at a substantial angle to the axis of the reference surface 13 of revolution. It also shows a workpiece which has a shoulder 55 which interferes with the generation of at least a portion of the surface of revolution which is to be finished. The abrasive wheel 18 is mounted on the spindle 56 and its interior is formed with a complex surface of revolution 30 which is to be reproduced on the workpiece. The operative surface 30 is provided with a silhouette which is the same as, but of substantially larger diameter than the silhouette of the surface of revolution to be formed on the workpiece and the surface of revolution of the dressing wheel. The dressing wheel is mounted on a shaft that is rotated and is formed with the surface of revolution whose silhouette is the same as the silhouette of the surface of revolution on the workpiece. This means that the dressing wheel can enter the open end of the abrasive wheel and dress it by a radial plunge movement and the workpiece can be introduced into the abrasive wheel in the same manner and be ground by a radial plunge movement.

The operation of the invention will be readily understood in view of the above description. In connection with FIGS. 1 and 2, it can be seen that the chucking means 24 is moved on the conveyor 23 back and forth from the holder 21 to the workhead 15. The chucking means 24 is connected to a carrier hoist 36 which rolls around the conveyor 23. It should be noted that a second chucking means 24' is provided with a locating surface 25' and a container 26' and is itself suspended from a carrier hoist 36'. When the locating surface 25 is inserted and mates with the locating surface 39 in the workhead they are clamped in place by the camlock and the motor 34 serves to drive the spindle 16, so that it in turn drives the holder 25 and the workpiece 11. At that time the grinding operation is performed on the workpiece in the manner which will be described below.

At the same time that the workpiece 11 is being ground, a similar unground workpiece is attached to the chucking means 24. The chucking means is attached by the insertion of the locating surface 25 into the socket providing the locating surface 22, the two of them being locked together tightly by the camlock 42. A weight 43 is similar to the total unbalanced weight of the workpiece and the container 26 with the alloy in place. Assuming that there is no workpiece 11 already locked in the body 41 of alloy, the alloy is heated by the introduction into the coil 45 of a heated liquid from the heater 29. As soon as the alloy is melted the workpiece 12 is dropped into the container with the portion 12 lying in the body 41 of alloy. The reference surface 13 at the other end of the workpiece is clamped between the pressure bars 51 and 52 on the one hand, and the pressure bar 49 on the other hand which is urged downwardly by pneumatic pressure applied to the cylinder 48. As soon as the workpiece is tightly clamped in this manner, the valve 53 and 54 are suitably manipulated to shut off the heater fluid and introduce the refrigeration fluid from the apparatus 28. In a short while the alloy will harden and the workpiece is locked in place on the chucking means 24. By that time, assuming that the grinding operation has been completed, the chucking means 24 at the workhead 15 is released and is carried along the conveyor by its carrier hoist 36. Since the conveyor is oval, the completed workpiece is carried backwardly toward the holder 21, while the unfinished workpiece is carried toward the grinding machine portion of the apparatus, at which time its locating surface 25' is introduced into the socket in the workhead 15 and is locked in place.

Figure 7:
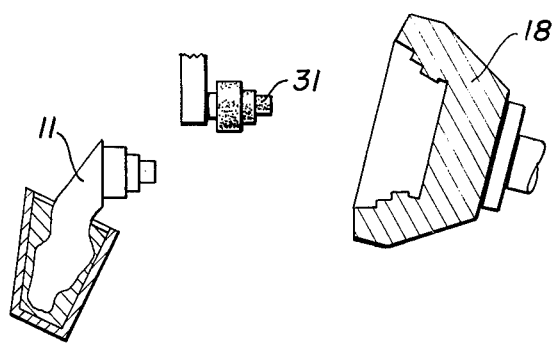
FIGS. 7–12 are schematic views of certain operative elements of the machine, showing their relationship during various stages of a grinding operation.
Figure 8:
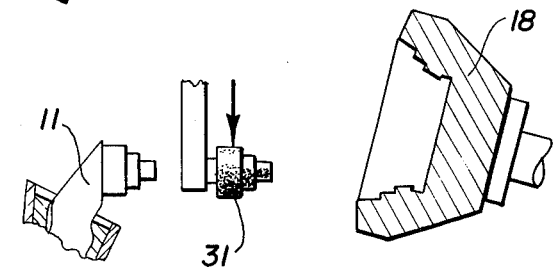
Figure 9:
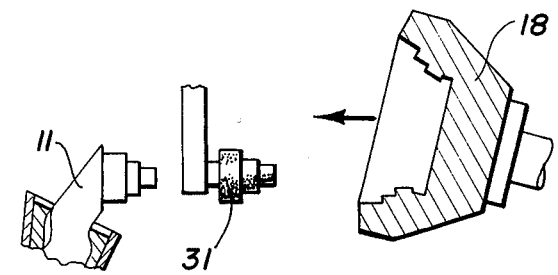
Figure 10:
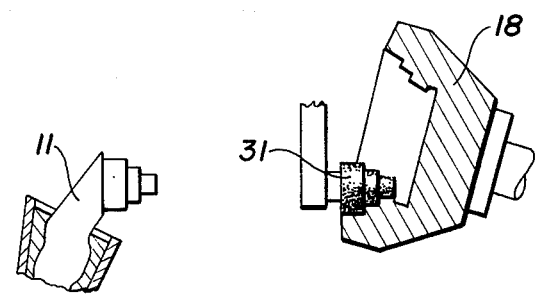
Figure 11:
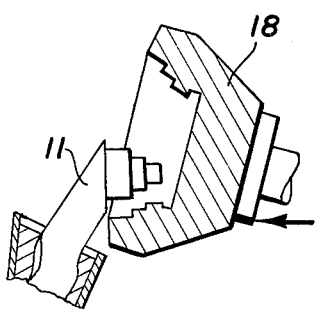
Figure 12:
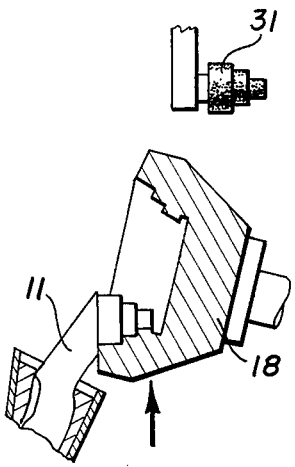

The operation of the grinding portion of the cycle will be described in connection with FIG. 6 on the one hand, (which shows the details of the grinding wheel and the workpiece) and FIGS. 7–12 which shows the operative steps. In FIG. 7 the workpiece is shown mounted on the workhead and rotatable about its axis. The wheel 18 is removed from the workpiece and from the dressing apparatus and is also rotated. The dressing apparatus 31 is shown as located at the side of the machine in inoperative position. In FIG. 8 the dressing apparatus 31 is moved into operative position generally in alignment with the axis of the workpiece 11. In FIG. 9 the dressing apparatus is moved to the right until it lies within the cup of the wheel 18. In FIG. 10 the dressing apparatus 31 is then moved laterally on a plunge dress into the operative surface of the wheel 18. The movement of the dressing apparatus is then reversed, the apparatus 31 moving forwardly until it reaches the position shown in FIG. 9 and then axially until it arrives at the position shown in FIG. 8 and then radially rearwardly again to the position shown in FIG. 7. At that time, as is shown in FIG. 11, the grinding wheel 18 is moved over the workpiece so that the workpiece lies inside of the cup of the wheel. The wheel is then moved radially across the machine to perform a plunge grind on the workpiece 11. This is done on a plunge grind. In both the dressing plunge (shown in FIG. 10), and the grinding plunge (shown in FIG. 12) the two elements are brought together with a controlled-force movement where the rate of the plunge is allowed to vary but the force with which the elements press together is controlled. Furthermore, during the dressing operation shown in FIG. 10, the dressing apparatus 31 is rotated in the opposite direction of the rotation of the abrasive wheel 18.

The advantages of the present invention will now be readily understood in view of the above description. The present process avoids the use of a plurality of fixtures for a given workpiece and also avoids the plurality of fixtures for all the different workpieces. It allows doing all the surfaces at the same time. The present invention involves a unique workholding device with the capability of holding and positioning accurately in repetitive production cycles a portion of a workpiece such as, the jet lug sections of the tri-bit rock drill assembly. Since the workpiece needs to have finished all bearings seal and retaining surfaces, including the locating surface, it leaves only unrelated surfaces for workholding and the present transfer apparatus is called for. This invention uses a low melt dimensionally stable matrix to fix accurately the workpiece related to the locating surface and to its own fixture locating surfaces. The original workpiece locations may then be removed and the part and shuffle transferred without loss of relative location to the grinding machine. This takes the place of what has been used in the past, that is to say, a number of mechanical devices employed by the industry to accomplish these ends, but which have required many operations have been more costly and have not produced compatible comparable workpiece quality. By using a work loading station which is separate from the grinding portion of the system, the time required for loading the workpiece on the shuttle or chucking means is not subtracted from the grinding portion of the operation. The grinding system of using the inside of a cantilevered cup-shaped wheel allows all of the surfaces to be "qualified" together and finished together. It involves as one of its novel features, the use of an internal plunge-formed dress for multiple surfaces.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Grinding machine, comprising
   a. a workpiece-holding chuck having a locating surface and having an open-ended container normally holding a low-temperature melting alloy in which a first portion of the workpiece is embedded with a second portion of the workpiece with a reference surface exposed on which the grinding operation is to be performed,
   b. a workhead and a wheelhead mounted for relative controlled movement to perform the grinding operation, the workhead having a locating surface for engagement by the locating surface on the chuck, and
   c. a setup head remote from the workhead having a locating surface exactly similar to the locating surface on the workhead and having a clamping means for engaging the said reference surface to hold the workpiece in the container in such a way that the locating surface of the chuck and the reference surface of the workpiece lie in a predetermined geometric relationship.

2. Grinding machine as recited in claim 1, wherein means is provided in connection with the setup head to heat the alloy quickly above its melting point for the removal of a finished workpiece and the introduction of an unfinished workpiece and also to cool the alloy quickly to lock the unfinished workpiece in place in the container.

3. Grinding machine as recited in claim 2, wherein the wheelhead is provided with a rotatable cantilevered spindle on which is mounted a cup-shaped abrasive wheel on the interior of which is formed a surface of revolution which is to be reproduced on the workpiece and a diamond dressing wheel having a similar surface of revolution which is cantilever-supported and rotated by a motor.

* * * * *